R. WAGONER, Jr.
Attachment for Corn-Planters.
No. 196,728.  Patented Oct. 30, 1877.
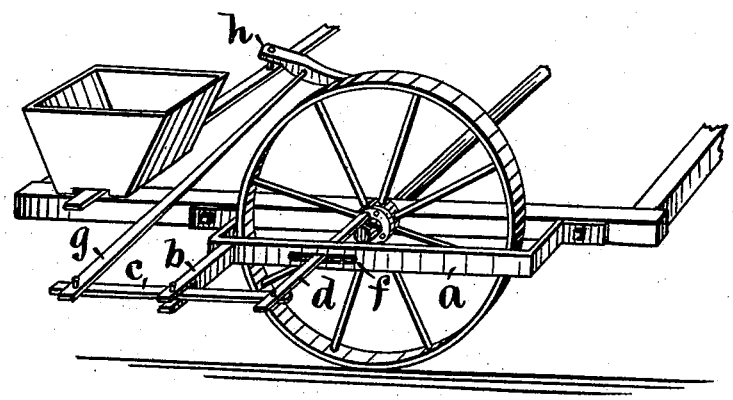
Witnesses:
M. E. Orwig.
P. O. Kenyon.
Inventor:
Reuben Wagoner, Jr.
By Thomas G. Orwig,
Attorney.

UNITED STATES PATENT OFFICE.

REUBEN WAGONER, JR., OF NEWTON, IOWA, ASSIGNOR OF ONE-THIRD HIS RIGHT TO LEVI W. MILLS, OF SAME PLACE.

IMPROVEMENT IN ATTACHMENTS FOR CORN-PLANTERS.

Specification forming part of Letters Patent No. 196,728, dated October 30, 1877; application filed April 2, 1877.

*To all whom it may concern:*

Be it known that I, REUBEN WAGONER, Jr., of Newton, in the county of Jasper and State of Iowa, have invented a Corn-Planter Attachment, of which the following is a specification:

The object of my invention is to provide a simple attachment that can be readily applied to corn-planters to automatically operate the seed-slide and plant seed at regular intervals of time and space as the machine advances across a field.

It consists in a series of levers arranged and combined with a bracket in such a manner that the bracket can be readily attached to the carriage-frame of a planter, and the levers connected with the hub of the carriage-wheel, to convert rotary motion into rectilinear, and impart a reciprocating motion to the seed-slide, all as hereinafter fully set forth.

My drawing is a perspective view, illustrating the construction, application, and operation of my complete invention.

$a$ represents a bracket, designed to be attached to the outside of the frame of the carriage in a horizontal position, to inclose the carriage-wheel. $b$ is a fulcrum, rigidly fixed to the front end of the bracket to stand out laterally and horizontally. $c$ is a lever pivoted to the end of the fulcrum $b$. $d$ is a minor lever, pivoted to the rear end of the lever $c$, and passed inward through a slot, $f$, in the bracket $a$, to connect with the hub of the wheel. It has a stud or pin on its end, designed to fit and move in a cam-groove formed in and around the hub of the carriage-wheel, or in an auxiliary hub attached to the hub of the carriage-wheel. To steady the motion of the lever $d$, and to prevent friction and binding in the slot $f$, anti-friction rollers may be fixed in the slot, on each side of the lever $d$. $g$ is a lever pivoted to the front end of the lever $c$. It extends inward to connect with the seed-slide of the planter. $h$ is a latching device, pivoted to the free end of the lever $g$, to serve as a means of throwing my operative mechanism in and out of gear. It has a pin projecting downward at its front end, to enter a corresponding hole in the seed-slide. By pressing on the rear end of the latch the latch-pin is disengaged from the seed-slide, and the automatic dropping mechanism thereby placed out of gear.

In the practical operation of my invention, each revolution of the carriage-wheel and its hub, having a cam-groove, will, by means of the two cams in the groove and the pin on the end of the lever $d$, cause a reciprocating motion to be imparted to the seed-slide of the planter through the medium of the levers $c$, $d$, and $g$, and the latching device $h$, and each half-motion, or each right and left motion, of the seed-slide will simultaneously drop seed from the seed-boxes and plant two parallel rows.

A simple, cheap, and durable mechanism is thus provided, that can be readily attached to a corn-planter, to save the labor and cost of the attendant usually required to operate the seed-slide by means of a hand-lever.

I claim as my invention—

The attachment for corn-planters, composed of the bracket $a$, having the fulcrum $b$ and slot $f$, the vibrating lever $c$, the reciprocating lever $d$, having a pin on its end, to engage a cam-groove in or on the hub of the carriage-wheel, and the lever $g$, carrying a latching device, $h$, to engage the seed-slide, substantially as and for the purposes shown and described.

REUBEN WAGONER, JR.

Witnesses:
D. EDMUNDSON,
M. D. CUTHBERTSON.